(12) United States Patent
Kim

(10) Patent No.: US 7,869,836 B2
(45) Date of Patent: Jan. 11, 2011

(54) POWER SAVING DEVICES AND POWER SAVING METHODS FOR MOBILE ACCESS POINT, AND WIRELESS NETWORK SYSTEMS

(75) Inventor: Bong-Chan Kim, Seoul (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 841 days.

(21) Appl. No.: 11/605,967

(22) Filed: Nov. 30, 2006

(65) Prior Publication Data
US 2007/0159992 A1    Jul. 12, 2007

(30) Foreign Application Priority Data
Jan. 9, 2006    (KR) .................. 10-2006-0002345

(51) Int. Cl.
H04M 1/00    (2006.01)
H04B 1/38    (2006.01)

(52) U.S. Cl. .................. 455/574; 370/311; 370/318; 455/572; 455/127.1; 455/343.1; 455/343.2

(58) Field of Classification Search .................. 455/574, 455/572, 127.1, 343.1, 343.2; 370/311, 318
See application file for complete search history.

(56) References Cited

U.S. PATENT DOCUMENTS

| 5,710,975 | A  | * | 1/1998  | Bernhardt et al. ......... 340/7.22 |
| 7,436,790 | B2 | * | 10/2008 | Todd et al. ................... 370/311 |
| 2005/0197171 | A1 | * | 9/2005  | Son et al. ..................... 455/574 |
| 2006/0025134 | A1 | * | 2/2006  | Cho et al. ................. 455/435.1 |
| 2006/0030305 | A1 | * | 2/2006  | Lee et al. ..................... 455/418 |
| 2006/0229023 | A1 | * | 10/2006 | Alon et al. ..................... 455/69 |
| 2007/0008915 | A1 | * | 1/2007  | Kim et al. ................... 370/311 |

FOREIGN PATENT DOCUMENTS

KR    20050050987-10    * 12/2006

* cited by examiner

Primary Examiner—Kamran Afshar
Assistant Examiner—Munsoon Choo
(74) Attorney, Agent, or Firm—H.C. Park & Associates, PLC

(57) ABSTRACT

In a power saving device and power saving method for a mobile access point, the power saving device sets a minimum power saving interval among power saving intervals of at least one first station coupled to the mobile access point as a power saving interval of the mobile access point. The power saving device prevents a power supply voltage from being supplied to at least one first wireless interface wirelessly communicating with the first station(s) during the power saving interval of the mobile access point when a minimum remaining power saving interval of at least one second station working in a power saving mode is longer than the power saving interval of the mobile access point.

20 Claims, 6 Drawing Sheets

POWER SAVING DEVICES AND POWER SAVING METHODS FOR MOBILE ACCESS POINT, AND WIRELESS NETWORK SYSTEMS

CLAIM OF PRIORITY

This application makes reference to, incorporates the same herein, and claims all benefits accruing under 35 U.S.C. §119 from an application for POWER SAVING APPARATUS AND METHOD IN MOBILE ACCESS POINT earlier filed in the Korean Intellectual Property Office on the 9$^{th}$ of Jan. 2006 and there duly assigned Ser. No. 10-2006-0002345.

BACKGROUND OF THE INVENTION

1. Technical Field

The present invention relates to power saving devices and power saving methods for a mobile access point.

2. Related Art

A wireless local area network (WLAN) wirelessly communicates with a network using electric waves instead of using cables. The WLAN has been developed so as to solve difficulties of installation, maintenance and mobility of the cables. The demand for the WLAN has increased due to the increase in the number of users requiring wireless communication with a network.

The WLAN includes an access point (AP) and a plurality of stations, i.e. a plurality of mobile stations. The access point functions as a base station of a mobile communication system or as a hub of a wire network system, and sends electric wave signals to the stations so that the users of the stations located within a predetermined transmission distance may access the Internet and the network.

The access point accesses the Internet via wire interfaces, such as an Ethernet interface or the like. Since the access point has to be coupled to the Internet via the wire interface, the access point may not be easily moved from one place to another place, and thus it is provided with power supply voltage via a power cable.

The stations communicate with the access point via wireless interfaces, such as a WLAN interface, or the like, and access the Internet via the access point.

Since the stations communicate with the access point via wireless interfaces, the stations may be easily moved from one place to another place. However, the stations which are moved from one place to another place may not be provided with the power supply voltage via the power cable, and thus they are provided with the power supply voltage from batteries, namely, they are battery powered. However, the stations need power management because of the limited power capacity of the battery.

In a conventional WLAN system, only the stations located within a service area of the access point which is fixed to a location may communicate with the access point.

The station which communicates with the access point via the WLAN has to be located within the service area of the access point which is fixed to a location. Thus, it is inconvenient that the user of the station has to move to the service area of the access point which is fixed to a location so as to communicate with the access point via the WLAN. Wireless Broadband Internet service may solve the above inconvenience.

In the wireless Broadband Internet service, since the conventional access point which is fixed to a location is replaced by a mobile access point, the user of the station does not have to move to the service area of the access point which is fixed to a location so as to communicate with the access point via the WLAN.

In other words, the user of the station may communicate with the mobile access point which is installed on public transportation, such as bus, train and the subway, etc., via the WLAN.

It should be noted that, since the mobile access point is moved from one place to another place, the mobile access point receives power supply voltage from a battery. Thus, the mobile access point requires a power saving mechanism so as to effectively use the limited power capacity of the battery.

SUMMARY OF THE INVENTION

It is an object of the present invention to provide power saving devices and power saving methods for a mobile access point, and a wireless network system having the power saving devices for the mobile access point, wherein the mobile access point may effectively use the limited power capacity of the battery.

According to an aspect of the present invention, a power saving device for a mobile access point having at least one wireless interface comprises: a controller configured to set a minimum power saving interval among power saving intervals of at least one first station coupled to the mobile access point as a power saving interval of the mobile access point, and configured to prevent a power supply voltage from being supplied to at least one first wireless interface wirelessly communicating with the first station(s) during the power saving interval of the mobile access point when a minimum remaining power saving interval of at least one second station working in a power saving mode is longer than the power saving interval of the mobile 8 access point.

The controller preferably provides the first wireless interface(s) with the power supply voltage when the second station (s) working in the power saving mode receives data from a network, or when the power saving interval of the mobile access point expires. The controller preferably provides the power supply voltage to a second wireless interface wirelessly communicating with the network regardless of the power saving interval of the mobile access point. The network corresponds to a Wireless Broadband Internet. The controller inserts the power saving interval of the mobile access point and a beacon frame generation period of the mobile access point into a beacon interval field of a beacon frame, and transmits the beacon frame to the first station(s).

According to another aspect of the present invention, a wireless network system comprises: at least one station; and a mobile access point having at least one wireless interface; wherein the mobile access point sets a minimum power saving interval among power saving intervals of at least one first station coupled to the mobile access point as a power saving interval of the mobile access point, and prevents a power supply voltage from being supplied to first wireless interface (s) wirelessly communicating with the first station(s) during the power saving interval of the mobile access point when a minimum remaining power saving interval of second station (s) working in a power saving mode is longer than the power saving interval of the mobile access point.

The mobile access point preferably provides the first wireless interface(s) with the power supply voltage when the second station(s) working in the power saving mode receives data from a network, or when the power saving interval of the mobile access point expires. The mobile access point provides the power supply voltage to a second wireless interface wirelessly communicating with the network regardless of the power saving interval of the mobile access point. The mobile access point inserts the power saving interval of the mobile access point and a beacon frame generation period of the mobile access point into a beacon interval field of a beacon frame, and transmits the beacon frame to the first station(s). The first station(s) adds the power saving interval included in the beacon frame received from the mobile access point to a listen interval of a beacon frame of the first station(s) and sets the summation result as a power saving interval of the station (s). The station(s) and the mobile access point are respectively battery powered.

According to still another aspect of the present invention, a power saving method for a mobile access point having at least one wireless interface comprises: setting a minimum power saving interval among power saving intervals of at least one first station coupled to the mobile access point as a power saving interval of the mobile access point; and preventing a power supply voltage from being supplied to at least one first wireless interface wirelessly communicating with the first station(s) during the power saving interval of the mobile access point when a minimum remaining power saving interval of second station(s) working in a power saving mode is longer than the power saving interval of the mobile access point.

The step of preventing a power supply voltage preferably includes providing the first wireless interface(s) with the power supply voltage when the second station(s) working in the power saving mode receives data from a network, or when the power saving interval of the mobile access point expires. The power saving method preferably further includes providing the power supply voltage to a second wireless interface wirelessly communicating with the network regardless of the power saving interval of the mobile access point. The setting of a minimum power saving interval includes inserting the power saving interval of the mobile access point and a beacon frame generation period of the mobile access point into a beacon interval field of a beacon frame so as to transmit the beacon frame to the first station(s).

According to yet another aspect of the present invention, a power saving method for a wireless network system, including at least one station and a mobile access point having at least one wireless interface, comprises: setting a minimum power saving interval among power saving intervals of at least one first station coupled to the mobile access point as a power saving interval of the mobile access point; and preventing a power supply voltage from being supplied to at least one first wireless interface wirelessly communicating with the first station(s) during the power saving interval of the mobile access point when a minimum remaining power saving interval of at least one second station working in a power saving mode is longer than the power saving interval of the mobile access point.

The step preventing a power supply voltage from being applied to at least one first wireless interface preferably comprises providing the first wireless interface(s) with the power supply voltage when the second station(s) working in the power saving mode receives data from a network, or when the power saving interval of the mobile access point expires. The power saving method preferably further includes providing the power supply voltage to a second wireless interface wirelessly communicating with the network regardless of the power saving interval of the mobile access point. The setting of a minimum power saving interval includes inserting the power saving interval of the mobile access point and a beacon frame generation period of the mobile access point into a beacon interval field of a beacon frame so as to transmit the beacon frame to the first station(s). The first station(s) adds the power saving interval, included in the beacon frame received from the mobile access point, to a listen interval of the beacon frame of the first station(s) so as to set the added result as a power saving interval of the station(s).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the power management of the stations is explained with reference to FIG. 1 which is a diagram illustrating a power saving method in a wireless local area network (WLAN) system, and FIG. 2 which is a diagram of a beacon frame transmitted from an access point (AP) to a station of FIG. 1.

Figure 1:
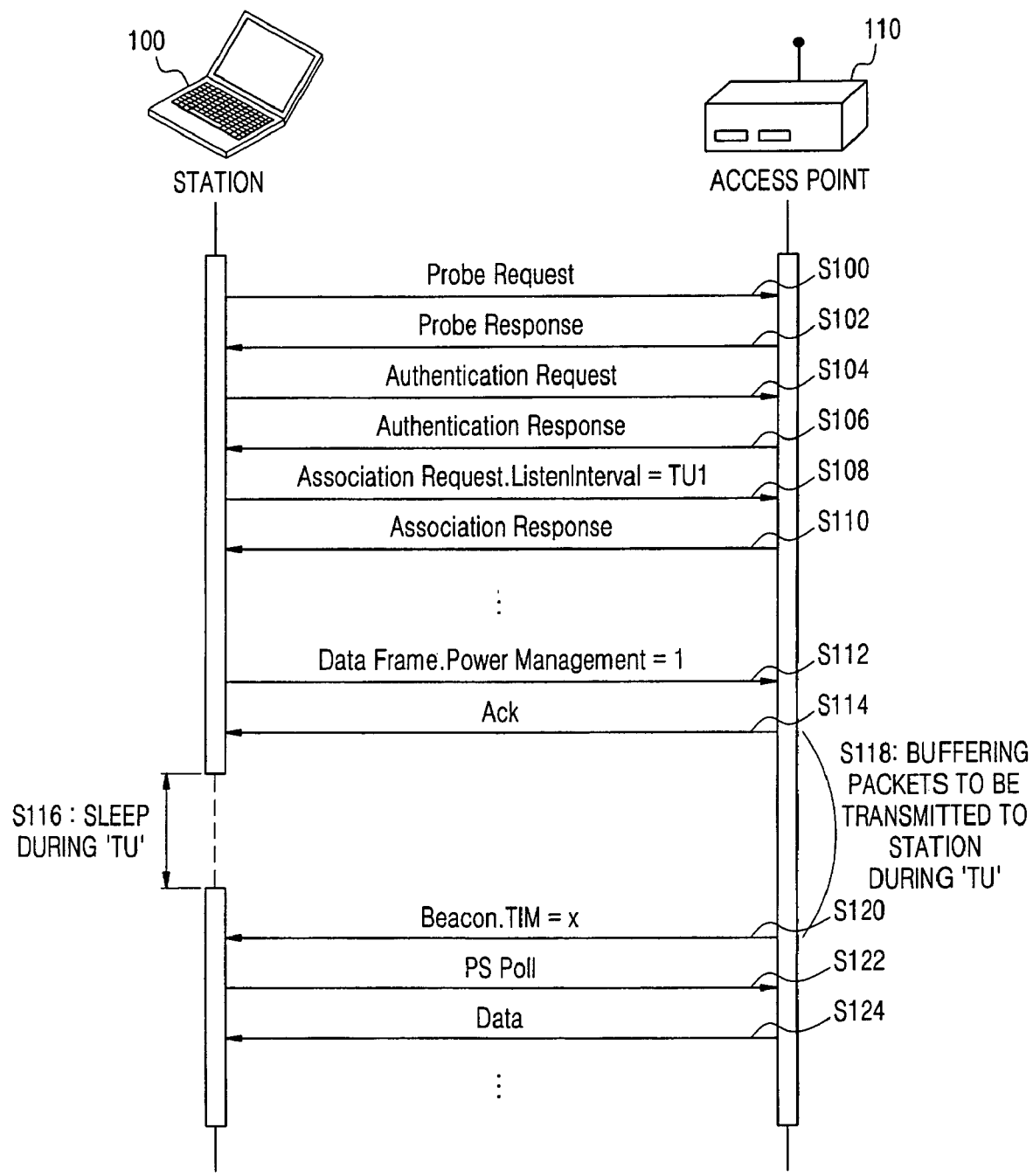
FIG. 1 is a diagram illustrating a power saving method in a wireless local area network (WLAN) system.

As shown in FIG. 1, a station 100 transmits a Probe Request frame, including a Service Set Identifier (SSID) of a network that the station 100 tries to access, to an access point 110 so that the station 100 searches for an access point having the SSID of the network which the station 100 tries to access (step S100).

The access point 110 transmits a Probe Response frame to the station 100 when the SSID of the access point 100 coincides with the SSID included in the Probe Request frame (step S102).

The station 100 transmits an Authentication Request frame to the access point 110 in response to the Probe Response frame (step S104).

The access point 10 transmits an Authentication Response frame when the station 100 is accessible to the access point 10 (step S106).

The station 100 transmits an Association Request frame to the access point 10 in response to the Authentication Response frame (step S108).

A Listen Interval field of the Association Request frame includes interval information which represents an interval during which a power saving mode of the station 100 is maintained after a power-off time point when a power supply voltage is not supplied to a WLAN interface of the station 100, the WLAN interface interfacing with the access point 110, of the station 100. In the power saving mode, power consumption of the battery is reduced.

The interval during which the power saving mode is maintained may be set to correspond to an interval (TU) which is required to receive a predetermined number of beacon frames transmitted from the access point 110.

The access point 110 transmits an Association Response frame to the station 100 (step S110).

The station 100 transmits a Data frame, the power management field of which has a value of '1', to the access point 110 so as to report that the station 100 enters into the power saving mode during the interval (TU) required for receiving the predetermined number of beacon frames transmitted from the access point 110 (step S112).

The access point 110 transmits an Ack frame to the station 100 in response to the Data frame, the power management field of which has the value of '1' (step S114).

The station 100 maintains a Sleep mode during the interval (TU) in response to the Ack frame (step S116).

Namely, the station 100 prevents the power supply voltage from being supplied to the WLAN interface, which communicates with the access point 110, during the interval (TU).

The access point 10 receives packets, which are to be transmitted to the station 100, from the Internet, buffers the received packets (step S118), and transmits Data frame which includes a Traffic Indication Map (TIM) field having a value of 'x' (step S120).

The TIM field having the value of 'x' represents that the packets to be transmitted to the station 100 are buffered during the interval (TU).

The station 100 enters into an active mode after the interval (TU), and transmits a Power Save Poll frame to the access point 110 in response to the Data frame which includes the TIM field having the value of 'x' (step S122) so as to request the access point 110 to transmit the packets received during the interval (TU) to the station 100.

The access point 110 transmits Data frame, which includes the packets received during the interval (TU), to the station 100 (step S124).

When the station 100 does not receive the Data frame which includes the TIM field having the value of 'x' from the access point 110, the station 100 periodically enters into the power saving mode every period of the interval (TU) while the packets to be transmitted to the station 100 during the interval (TU).

The station periodically performs the power saving mode every interval (TU), and thus may effectively use a battery having limited power capacity.

Hereinafter, exemplary embodiments of the present invention will be described in full detail with reference to the accompanying drawings so as enable those skilled in the art to easily implement the present invention.

Figure 3:
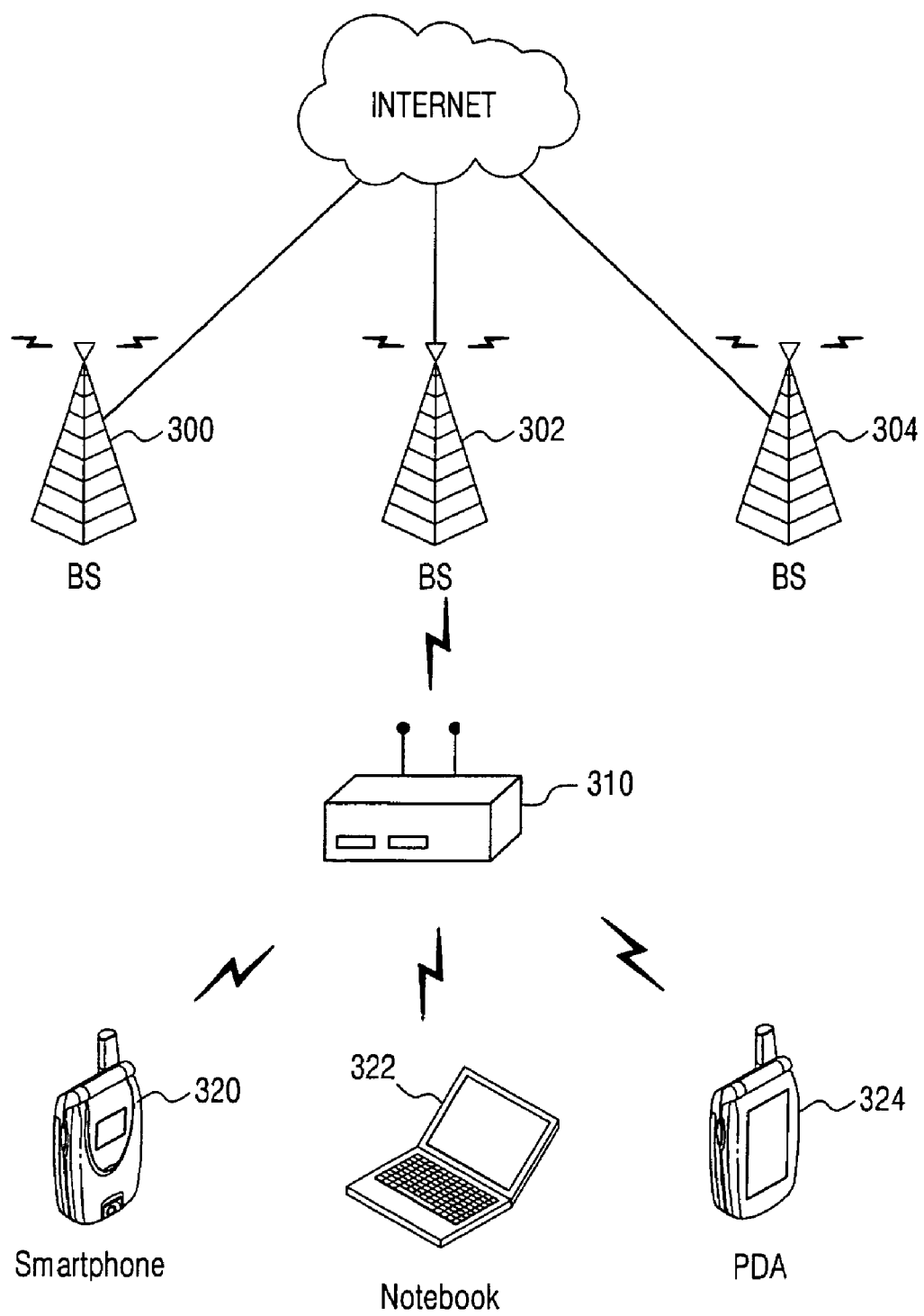
FIG. 3 is a schematic diagram illustrating a wireless system according to an exemplary embodiment of the present invention.

FIG. 3 is a schematic diagram illustrating a wireless system according to an exemplary embodiment of the present invention.

Referring to FIG. 3, the mobile access point 310 wirelessly communicates with the stations 320, 322 and 324 located within the service area of the mobile access point 310, and wirelessly communicates with base stations 300, 302 and 304 so as to access the Internet. Namely, the mobile access point 310 may wirelessly access Wireless Broadband Internet via the base stations 300, 302 and 304.

The stations 320, 322 and 324 exchange Probe frames and Authentication frames with the mobile access point 310, and then transmit an Association Request frame to the mobile access point 310 so as to access the mobile access point 310.

A Listen Interval field of the Association Response frame includes interval information (i.e. "Listen Interval") which represents an interval during which a power saving mode of a station is maintained after a power-off time point when a power supply voltage is not supplied to a WLAN interface of a station, the WLAN interface communicating with the mobile access point 310. In the power saving mode, power consumption of the battery is reduced.

The interval during which the power saving mode is performed may be set to correspond to an interval in which it is required to receive a predetermined number of beacon frames transmitted from the mobile access point 110.

The mobile access point 310 sets a minimum Listen Interval among Listen intervals of stations 320, 322 and 324 wirelessly coupled to the mobile access point 310 as a power saving interval of the mobile access point 310 so as to reduce the power consumption of the battery of the mobile access point 310, inserts the set power saving interval onto a beacon frame, and transmits the beacon frame having the set power saving interval to the stations 320, 322 and 324.

The stations 320, 322 and 324 add the power saving interval received from the mobile access point 310 to corresponding listen intervals of the stations 320, 322 and 324 so as to set the added result as power saving intervals (hereinafter, referred to as "a power saving interval of a station") of the stations 320, 322 and 324.

Next, the stations 320, 322 and 324 report that the stations 320, 322 and 324 periodically enter into the power saving mode every power saving interval of the stations 320, 322 and 324.

Accordingly, the mobile access point 310 calculates a time period which is required for a station wirelessly coupled to the mobile access point 310 to enter into an active mode, and enters into a power saving mode when a remaining power saving interval of a station which firstly enters into the active mode is longer than the power saving interval of the mobile access point 310. In this case, it is assumed that the stations 320, 322 and 324 are wirelessly coupled to the mobile access point 310.

In other words, the mobile access point 310 prevents a power supply voltage from being supplied to a wireless interface wirelessly communicating with the stations 320, 322 and 324 when the remaining power saving interval of the station which firstly enters into the active mode is longer than the power saving interval of the mobile access point 310.

The mobile access point 310 does not prevent a power supply voltage from being supplied to a wireless interface wirelessly communicating with the Wireless Broadband Internet because the mobile access point 310 may receive packets to be transmitted to the stations 320, 322 and 324 from the Wireless Broadband Internet while the mobile access point 310 are in the power saving mode.

The mobile access point 310 enters into the active mode when the mobile access point 310 receives packets to be transmitted to the stations 320, 322 and 324 from the Wireless Broadband Internet while the mobile access point 310 are in the power saving mode or when the power saving interval of the mobile access point 310 expires.

Figure 4:
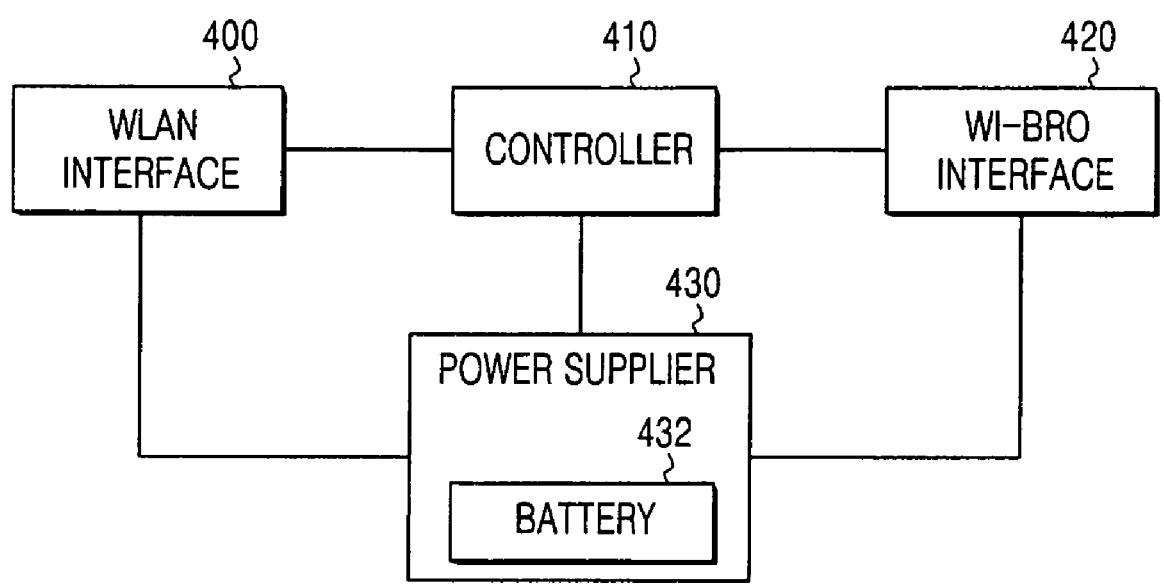
FIG. 4 is a block diagram of a Wireless Access Point according to an exemplary embodiment of the present invention.

FIG. 4 is a block diagram of a Wireless Access Point according to an exemplary embodiment of the present invention.

As shown in FIG. 4, the mobile access point includes a WLAN interface 400, a controller 410, a Wi-Bro interface 420 and a power supplier 430.

The WLAN interface 400 interfaces wireless communication with the stations 320, 322 and 324 located within the service area of the mobile access point.

The Wi-Bro interface 420 interfaces wireless communication with the Wireless Broadband Internet.

The power supplier 430 includes a battery 432, provides a power supply voltage to the mobile access point, and provides a power supply voltage to the WLAN interface 400 under the control of the controller 410.

The controller 410 stores the Listen Intervals included in the Association Request frames received from the stations within the service area of the mobile access point, and sets a minimum Listen Interval of the stored Listen Intervals as a Power Saving Interval for reducing the power consumption of the battery 432.

The Listen Intervals received from the stations represents an interval which is required for the stations to receive a predetermined number of beacon frames transmitted from the mobile access point 110. Specifically, the Listen Intervals received from the stations represent a time period during which the power saving mode for reducing the power consumption of the battery 432 is performed.

The controller 410 inserts the set Power Saving Interval into the beacon frame, and transmits the beacon frame including the set Power Saving Interval to the stations located within the service area of the mobile access point.

Next, the controller 410 calculates a time period which is required for a station, which is in the power saving mode, to enter into the active mode, and controller 410 enters into the power saving mode when a remaining power saving interval of the station which first enters into the active mode is longer than the power saving interval of the mobile access point.

In other words, the controller 410 of the mobile access point prevents the power supply voltage from being supplied to the WLAN interface 400 when the remaining power saving interval of the station which first enters into the active mode is longer than the power saving interval of the mobile access point.

The controller 410 maintains the power supply to the Wi-Bro interface 420 wirelessly interfacing with the Wireless Broadband Internet because the controller 410 may receive packets to be transmitted to the stations from the Wireless Broadband Internet while the controller 410 of the mobile access point is in the power saving mode.

The controller 410 of mobile access point enters into the active mode when the mobile access point receives packets to be transmitted to the stations from the Wireless Broadband Internet while the mobile access point is in the power saving mode or when the power saving interval of the mobile access point expires.

Figure 5:
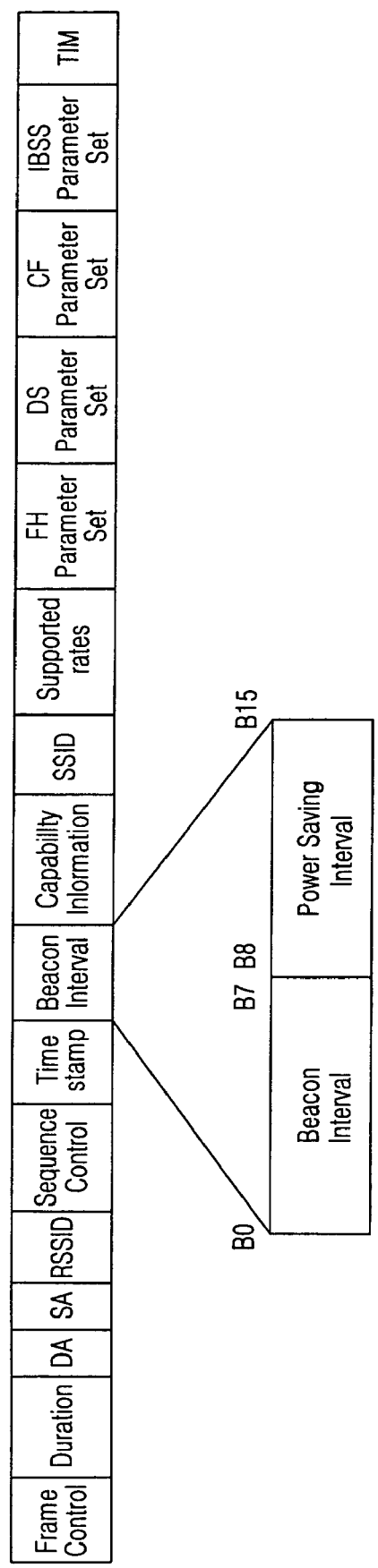
FIG. 5 is a diagram of a beacon frame transmitted from a Wireless Access Point to a station of FIG. 3.
Figure 6:
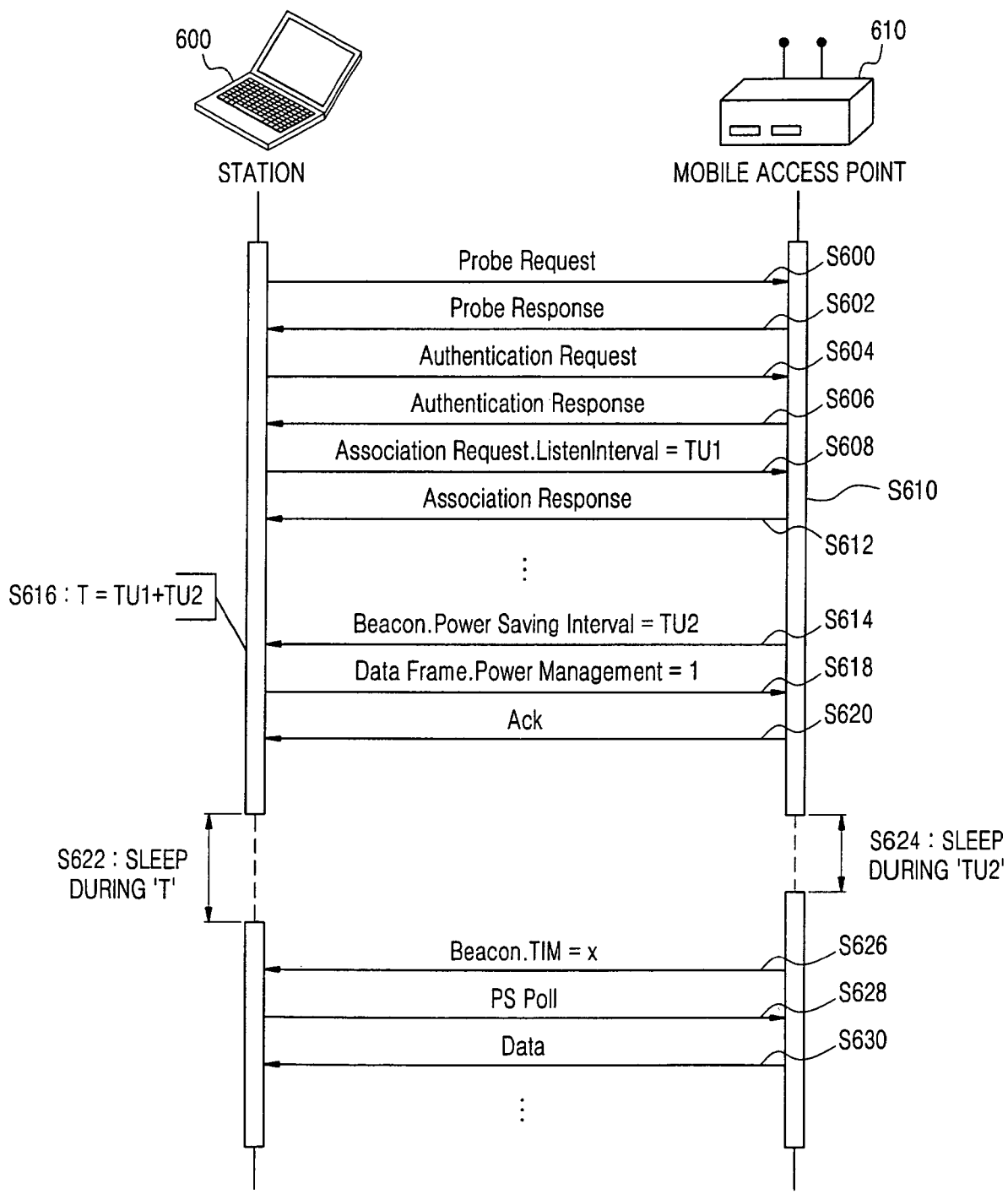
FIG. 6 is a diagram of a power saving method at a Wireless Access Point in a wireless network according to an exemplary embodiment of the present invention.

FIG. 5 is a diagram of a beacon frame transmitted from a Wireless Access Point to a station of FIG. 3, and FIG. 6 is a diagram of a power saving method at a Wireless Access Point in a wireless network according to an exemplary embodiment of the present invention.

As shown in FIG. 6, a station 600 transmits a Probe Request frame, including an SSID (Service Set Identifier) of a network which the station 600 tries to access, to a mobile access point 610 so that the station 600 searches for an access point having the SSID of the network which the station 600 tries to access (step S600).

The mobile access point 610 transmits a Probe Response frame to the station 600 when the SSID of the mobile access point 610 coincides with the SSID included in the Probe Request frame (step S602).

The station 600 transmits an Authentication Request frame to the mobile access point 610 in response to the Probe Response frame (step S604).

The mobile access point 610 transmits an Authentication Response frame when the station 600 is accessible to the mobile access point 610 (step S606).

The station 600 transmits an Association Request frame to the mobile access point 610 in response to the Authentication Response frame (step S608).

A Listen Interval field of the Association Request frame includes interval information, that is, a Listen Interval (TU1), which represents an interval during which a power saving mode of the station 600 is maintained after a power-off time point when a power supply voltage is not supplied to a WLAN interface of the station 600, the WLAN interface interfacing with the mobile access point 610. In the power saving mode, the power consumption of the battery is reduced.

The interval (TU1), during which the power saving mode of the station 600 is maintained, may be set to correspond to an interval which is required to receive a predetermined number of beacon frames transmitted from the mobile access point 610.

The mobile access point 610 stores the Listen Interval (TU1) included in the Association Request frame (step S610), and transmits an Association Response frame to the station 600 (step S612).

The mobile access point 610 sets a minimum Listen Interval, among Listen intervals transmitted from at least one station wirelessly communicating with the mobile access point 610, as a power saving interval (TU2) of the mobile access point 610 so as to reduce the power consumption of the battery of the mobile access point 610.

The mobile access point 610 inserts the set power saving interval (TU2) and a Beacon Interval onto a beacon frame, and transmits the beacon frame having the set power saving interval (TU2) and the Beacon Interval to the station 600 (step 614). The Beacon Interval represents a beacon frame generation period.

Referring to FIG. 5, a Beacon Interval field of the beacon frame includes the power saving interval (TU2) of the mobile access point 610 and the Beacon Interval.

The Beacon Interval field includes 16 bits (B0, B1, . . . , B15). The power saving interval (TU2) is included in an upper 8 bits (B15, . . . , B8), and the Beacon Interval is included in a lower 8 bits (B7, . . . , B0).

Since the other fields of the beacon frame, except for the Beacon Interval, are defined in IEEE 802.11, description of the other fields will be omitted.

Figure 2:
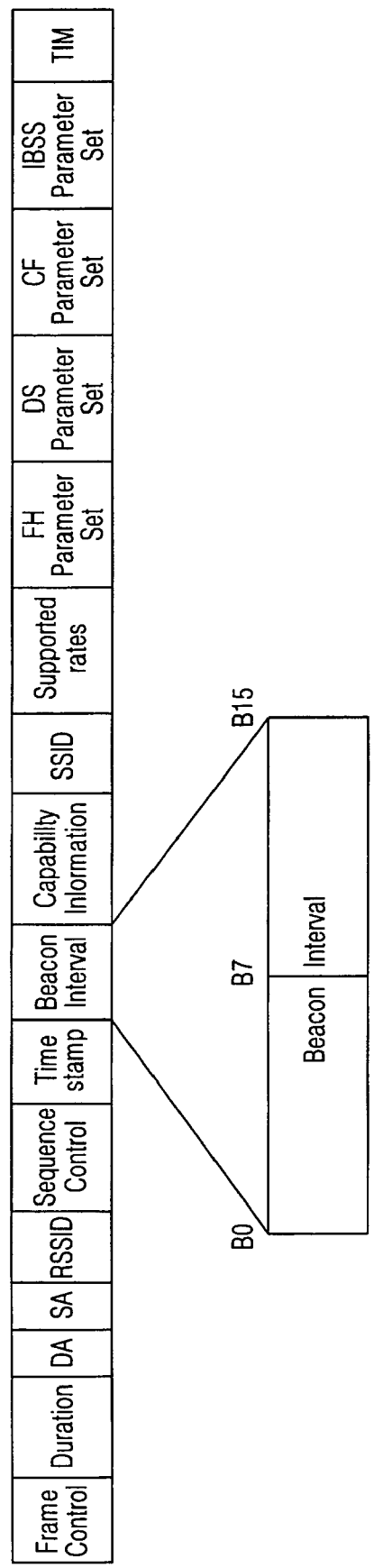
FIG. 2 is a diagram of a beacon frame transmitted from an access point (AP) to a station of FIG. 1.

The Beacon Interval field of the beacon frame shown in FIG. 5 differs from the Beacon Interval field of the beacon frame shown in FIG. 2.

The beacon frame shown in FIG. 2 corresponds to a beacon frame which is transmitted from the access point 110 to the station 100 in step S120 of FIG. 1.

The Beacon Interval field of the beacon frame of FIG. 2 includes 16 bits, and differs from the Beacon Interval field of the beacon frame of FIG. 5 in that the Beacon Interval field of the beacon frame of FIG. 2 includes only a Beacon Interval representing a beacon frame generation period.

The station 600 adds the power saving interval (TU2) received from the mobile access point 610 to the Listen Interval (TU1) of the station 600, and sets the summation result as a power saving interval (T) of the station 600 (step S616).

Next, the station 600 transmits a Data frame, the power management field of which has a value of '1', to the mobile access point 610 so as to report that the station 600 enters into the power saving mode every power saving interval (T) of the station 600 (step S618).

The mobile access point 610 transmits an Ack frame to the station 600 in response to the Data frame, the power management field of which has the value of '1' (step S620).

The station 600 maintains a Sleep mode during the power saving interval (T) of the station 600 in response to the Ack frame (step S622).

Specifically, the station 600 prevents the power supply voltage from being supplied to the WLAN interface, which communicates with the mobile access point 610, during the set power saving interval (T) of the station 600.

The mobile access point 610 enters into the active mode when the mobile access point 610 receives packets to be transmitted to the stations, which are located within the service area of the mobile access point 610, from the Wireless Broadband Internet via the Wi-Bro interface 420, or when the power saving interval of the mobile access point 610 expires.

The mobile access point 610 calculates a time period which is required for a station, which is in the power saving mode, to enter into the active mode, enters into the power saving mode, and maintains the power saving mode during the power saving interval (TU2) when the remaining power saving interval of a station which first enters into the active mode is longer than the power saving interval (TU2) of the mobile access point 610.

The mobile access point 610 enters into the active mode after the power saving interval (TU2) of the mobile access point 610, and generates a Data frame which includes a TIM (Traffic Indication Map) field having a value of 'x' when the mobile access point 610 receives packets, which are to be transmitted to the station 600 located within the service area of the mobile access point 610, from the Wireless Broadband Internet (step S626).

FIG. 6 shows that the mobile access point 610 enters into the active mode after the power saving interval (TU2) of the mobile access point 610. However, the mobile access point 610 may enter into the active mode when the mobile access point 610 receives packets, which are to be transmitted to the station 600, from the Wireless Broadband Internet while the mobile access point 610 is in the power saving mode during the power saving interval (TU2) of the mobile access point 610.

The station 600 transmits a Power Save (PS) Poll frame to the mobile access point 610 so as to request the mobile access point 610 to transmit the packets received during the interval (TU2) to the station 600, in response to the Data frame that includes the TIM field having the value of 'x' (step S628).

The mobile access point 610 transmits a Data frame, which includes the packets received during the interval (TU2), to the station 600 (step S630).

According to the power saving device for the mobile access point and the power saving method for the mobile access point, the mobile access point effectively uses the battery having a limited power capacity.

While exemplary embodiments of the present invention and their advantages have been described in detail, it should be understood that various changes, substitutions and alterations may be made herein without departing from the scope of the invention.

What is claimed is:

1. A power saving device for a mobile access point having at least one wireless interface, the power saving device comprising:
a controller to set a minimum power saving interval among power saving intervals of at least one first station coupled to the mobile access point, the minimum power saving interval being set as a power saving interval of the mobile access point, the controller configured to prevent a power supply voltage from being supplied to at least one first wireless interface during the power saving interval of the mobile access point when a remaining power saving interval of a first station that first enters in an active mode is longer than the power saving interval of the mobile access point.

2. The power saving device of claim 1, wherein the at least one first wireless interface is configured to wirelessly communicate with said at least one first station, said controller provides said at least one first wireless interface with the power supply voltage when at least one of a first condition and a second condition occurs, said first condition comprising said first station in the power saving mode receiving data from a network, said second condition comprising the power saving interval of the mobile access point expiring.

3. The power saving device of claim 2, wherein said controller provides the power supply voltage to a second wireless interface of the mobile access point wirelessly communicating with the network regardless of the power saving interval of the mobile access point.

4. The power saving device of claim 2, wherein the network comprises a Wireless Broadband Internet.

5. The power saving device of claim 2, wherein said controller inserts the power saving interval of the mobile access point and a beacon frame generation period of the mobile access point into a beacon interval field of a beacon frame, and transmits the beacon frame to said at least one first station.

6. A wireless network system, comprising:
at least one station; and
a mobile access point having at least one wireless interface;
wherein said mobile access point is configured to set a minimum power saving interval among power saving intervals of at least one first station coupled to said mobile access point, the minimum power saving interval being set as a power saving interval of said mobile access point, said mobile access point being configured to prevent a power supply voltage from being supplied to at least one first wireless interface during the power saving interval of said mobile access point when a remaining power saving interval of a first station that first enters in an active mode is longer than the power saving interval of said mobile access point.

7. The wireless network system of claim 6, wherein the at least one first wireless interface is configured to wirelessly communicate with said at least one first station, said mobile access point provides said at least one first wireless interface with the power supply voltage when at least one of a first condition and a second condition occurs, said first condition comprising said first station in the power saving mode receiving data from a network, said second condition comprising the power saving interval of said mobile access point expiring.

8. The wireless network system of claim 7, wherein said mobile access point provides the power supply voltage to a second wireless interface of the mobile access point wirelessly communicating with the network regardless of the power saving interval of said mobile access point.

9. The wireless network system of claim 6, wherein said mobile access point inserts the power saving interval of said mobile access point and a beacon frame generation period of said mobile access point into a beacon interval field of a beacon frame, and transmits the beacon frame to said at least one first station.

10. The wireless network system of claim 9, wherein said at least one station adds the power saving interval in the beacon frame received from said mobile access point to a listen interval of a beacon frame of said at least one station to obtain a summation result, and sets the summation result as a power saving interval of said at least one station.

11. The wireless network system of claim 6, wherein said at least one station and said mobile access point are respectively battery powered.

12. A power saving method for a mobile access point having at least one wireless interface, the power saving method comprising:
setting a minimum power saving interval among power saving intervals of at least one first station coupled to the mobile access point as a power saving interval of the mobile access point; and
preventing a power supply voltage from being supplied to at least one first wireless interface during the power saving interval of the mobile access point,
wherein the mobile access point prevents the power supply voltage from being supplied when a remaining power saving interval of a first station that first enters in an active mode is longer than the power saving interval of the mobile access point.

13. The power saving method of claim 12, wherein the at least one first wireless interface is configured to wirelessly communicate with said at least one first station, and the preventing a power supply voltage from being supplied to said at least one first wireless interface comprises providing said at least one first wireless interface with the power supply voltage when at least one of a first condition and a second condition occurs, said first condition comprising said first station in the power saving mode receiving data from a network, said second condition comprising the power saving interval of the mobile access point expiring.

14. The power saving method of claim 12, further comprising providing the power supply voltage to a second wireless interface of the mobile access point wirelessly communicating with the network regardless of the power saving interval of the mobile access point.

15. The power saving method of claim 12, wherein setting a minimum power saving interval comprises inserting the power saving interval of the mobile access point and a beacon frame generation period of the mobile access point into a beacon interval field of a beacon frame, and transmitting the beacon frame to said at least one first station.

16. A power saving method for a wireless network system, the wireless network system comprising at least one station and a mobile access point having at least one wireless interface, the power saving method comprising:
setting a minimum power saving interval among power saving intervals of at least one first station coupled to the mobile access point as a power saving interval of the mobile access point; and
preventing a power supply voltage from being supplied to at least one first wireless interface during the power saving interval of the mobile access point,
wherein the mobile access point prevents the power supply voltage from being supplied when a remaining power saving interval of a first station that first enters an active mode is longer than the power saving interval of the mobile access point.

17. The power saving method of claim 16, wherein the at least one first wireless interface is configured to wirelessly communicate with said at least one first station, and preventing a power supply voltage from being supplied to said at least one first wireless interface comprises providing said at least one first wireless interface with the power supply voltage when at least one of a first condition and a second condition occurs, said first condition comprising said first station in the power saving mode receiving data from a network, said second condition comprising the power saving interval of the mobile access point expiring.

18. The power saving method of claim 16, further comprising providing the power supply voltage to a second wireless interface of the mobile access point wirelessly communicating with the network regardless of the power saving interval of the mobile access point.

19. The power saving method of claim 16, wherein setting a minimum power saving interval comprises inserting the power saving interval of the mobile access point and a beacon frame generation period of the mobile access point into a beacon interval field of a beacon frame, and transmitting the beacon frame to said at least one first station.

20. The power saving method of claim 19, wherein said at least one station adds the power saving interval in the beacon frame received from the mobile access point to a listen interval of the beacon frame of said at least one station to obtain a summation result, and sets the summation result as a power saving interval of said at least one station.

* * * * *